United States Patent
Wu

(10) Patent No.: US 8,837,426 B2
(45) Date of Patent: Sep. 16, 2014

(54) METHOD OF HANDLING CELL SELECTION FOR IN A WIRELESS COMMUNICATION SYSTEM AND RELATED MOBILE DEVICE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 835 days.

(21) Appl. No.: 12/564,924

(22) Filed: Sep. 23, 2009

(65) Prior Publication Data
US 2010/0159928 A1 Jun. 24, 2010

Related U.S. Application Data

(60) Provisional application No. 61/138,953, filed on Dec. 19, 2008.

(51) Int. Cl.
| | | |
|---|---|---|
| *H04W 4/00* | (2009.01) | |
| *H04W 36/00* | (2009.01) | |
| *H04M 1/66* | (2006.01) | |
| *G06F 15/16* | (2006.01) | |
| *H04W 48/16* | (2009.01) | |
| *H04W 48/10* | (2009.01) | |

(52) U.S. Cl.
CPC ............ *H04W 48/16* (2013.01); *H04W 48/10* (2013.01)
USPC ............ 370/331; 455/437; 455/411; 709/228

(58) Field of Classification Search
CPC .................................................... H04W 80/04
USPC .................... 370/331; 455/437, 411; 709/228
See application file for complete search history.

(56) References Cited

U.S. PATENT DOCUMENTS

| | | | |
|---|---|---|---|
| 6,334,052 B1 * | 12/2001 | Nordstrand | 455/411 |
| 2004/0068571 A1 * | 4/2004 | Ahmavaara | 709/228 |
| 2008/0167044 A1 * | 7/2008 | Natsume | 455/437 |
| 2009/0088154 A1 * | 4/2009 | Umatt et al. | 455/434 |
| 2009/0104905 A1 * | 4/2009 | DiGirolamo et al. | 455/434 |

FOREIGN PATENT DOCUMENTS

| | | |
|---|---|---|
| EP | 1 021 056 A1 | 7/2000 |
| TW | 200833134 | 8/2008 |
| WO | 2008094670 A2 | 8/2008 |

OTHER PUBLICATIONS

3gpp, 3GPP TS 36.304, May 1, 2008.
3gpp, 3GPP TSG-RAN2#64 meeting R2-087451, "Miscellaneous corrections and clarifications", Nov. 10, 2008.
Office action mailed on Jan. 7, 2013 for the Taiwan application No. 098141688, filing date Dec. 7, 2009, pp. 1-8.

* cited by examiner

*Primary Examiner* — Ian N. Moore
*Assistant Examiner* — Kiet Tang
(74) *Attorney, Agent, or Firm* — Winston Hsu; Scott Margo

(57) ABSTRACT

A method of handling cell selection for a mobile device in a wireless communication system is disclosed. The method includes when the mobile device has a radio resource control (RRC) connection with a cell and receives access barring information corresponding to a barred state of another cell, ignoring the access barring information.

12 Claims, 4 Drawing Sheets

METHOD OF HANDLING CELL SELECTION FOR IN A WIRELESS COMMUNICATION SYSTEM AND RELATED MOBILE DEVICE

CROSS REFERENCE TO RELATED APPLICATIONS

This application claims the benefit of U.S. Provisional Application No. 61/138,953, filed on Dec. 19, 2008 and entitled "METHODS OF HANDLING A CELL BARRED STATUS IN RRC CONNECTED MODE IN WIRELESS COMMUNICATION SYSTEM AND RELATED COMMUNICATION DEVICE" the contents of which are incorporated herein.

BACKGROUND OF THE INVENTION

1. Field of the Invention

The present invention relates to a method used in a wireless communication system and related mobile device, and more particularly to, a method of handling cell selection in the wireless communication system and related mobile device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

When a UE is switched on, a public land mobile network (PLMN) is selected by NAS (non access stratum, NAS). The PLMN may rely on several radio access technologies (RATs), e.g. UTRA and GSM. The NAS can control the RATs in which the cell selection should be performed, for instance by indicating RATs associated with the selected PLMN. The NAS provides a list of equivalent PLMNs. If any of PLMNs in the list is available, the access stratum (AS) use it for cell selection and cell reselection.

With the cell selection, the UE searches for a suitable cell of the selected PLMN and chooses the cell to provide available services, and further the UE shall tune to its control channel (i.e. establish BCCH, and PCCH). This choosing is known as "camping on the cell". The UE then registers its presence, by means of a NAS registration procedure, in the registration area of the chosen cell, if necessary. When camped on the cell, the UE regularly searches for a better cell according to the cell re-selection criteria. If a better cell is found, that cell is selected.

When the UE has completed the cell selection/reselection process and has chosen a cell, the UE monitors system information. According to the system information, such as cell status or cell reservations, the UE can know if the cell is barred, or reserved.

Cell status and cell reservation information are indicated in the SystemInformationBlockType1 by means of three Information Elements, described as follows: (1) cellBarred (type: "barred" or "not barred"). (2) cellReservedForOperatorUse (type: "reserved" or "not reserved"). (3) cellReservationExtension (type: "reserved" or "not reserved").

When the cell status of a cell is indicated as "not barred", "not reserved" for operator use and "not reserved" for future extension (Cell Reservation Extension), all UEs shall treat this cell as candidate during the cell selection and cell re-selection procedures. When the cell status is indicated as "not barred", "not reserved" for operator use and "reserved" for future extension (Cell Reservation Extension), the UEs shall behave as if the cell status "barred" is indicated. When the cell status "barred" is indicated, the UE is not permitted to select/re-select this cell, not even for emergency calls, and ignores the "Cell Reserved for future extension (Cell Reservation Extension) use" IE. In this situation, the UE shall select another cell.

However, those behaviors are only assigned to the UE which is operated in the RRC_idle mode. When the UE in the RRC_Connected mode reads SystemInformationBlockType1, the current specifications does not specify how the UE shall behave in the RRC_Connected mode in a cell with a barred or reserved status. As a result, problems may occur due to ambiguity.

In the first scenario, an E-UTRAN has a cell with the barred status to avoid the UEs in the RRC_Idle mode to camp on. In the meantime, the E-UTRAN intends to use the cell for handover in consideration of resource management. Namely, the UEs in the RRC_Connected mode can be moved to the cell by E-UTRAN indications. After the UEs in the RRC_Connected mode reads SystemInformationBlockType1 of the cell, the UEs all determine that the cell is barred. As a result, the handovers fail due to the barred status, thereby resulting in failure of the resource management plan for the cell.

In the second scenario, an E-UTRAN intends to use the cell for RRC connection re-establishment and designate the cell as a re-establishment cell. Therefore, the cell was set to the barred status to avoid the UE in the RRC_Idle mode to camp on. A UE in RRC connected mode in another cell has radio link failure and thereby initiates a RRC connection re-establishment procedure requesting cell re-selection. The UE in RRC connected mode only finds the re-establishment cell during the cell re-selection and thus selects the re-establishment cell. However, the RRC connection reestablishment fails since the UE determine that the cell is barred through the SystemInformationBlockType1. As a result, the resource management plan for the re-establishment cell fails.

In the third scenario, an E-UTRAN changes a cell status from the "not barred" status to the "barred" status for operation and maintenance purpose. In that cell, the UEs in the RRC_Idle mode select other cells to camp on. On the other hand, some UEs in the RR_Connected mode are determined to continue staying in the call for data transmission and reception due to implementation criteria of UE manufacturers. However, the E-UTRAN has already stopped data transmission and reception with the UEs in the RRC_Connected mode since the cell is barred for the maintenance purpose. This, thus, wastes power of the UEs in the RRC_Connected mode. In the other case, some of the UEs in the RRC_Connected mode are determined to switch to the RRC_Idle mode due to different implementation criteria of UE manufacturers. Therefore, the connection drops, causing transmission and reception problems.

To put it simply, when the cell is barred by the E-UTRAN indication, the current specification only specifies behaviors for those UEs in the RRC_Idle mode. Regarding to the UEs in the RRC_Connected mode, there has not been any regulation specified for the UE in the RRC_Connected mode to deal with the barred cell so far. Thus, without specification for the UE in the RRC_Connected mode, the problems, such as handover failure, radio link failure, extra power consumption and transmission suspension, occur.

SUMMARY OF THE INVENTION

Therefore, the present invention provides a method of handling cell selection associated with a barred cell in a wireless communication system and related mobile device to avoid the abovementioned problems.

The present invention discloses a method of handling cell selection for a mobile device in a wireless communication system. The method includes when the mobile device has a radio resource control (RRC) connection with a first cell and receives access barring information corresponding to a barred state of a second cell, ignoring the access barring information.

The present invention further discloses a mobile device of a wireless communication system for handling cell selection or reselection. The mobile device includes a computer readable recording medium, and a processor. The computer readable recording medium is used for storing program code corresponding to a process. The processor is coupled to the computer readable recording medium, and used for processing the program code to execute the process. The process includes when the mobile device has a RRC connection with a first cell and receives access barring information corresponding to a barred state of a second cell, ignoring the access barring information.

The present invention further discloses a method of handling cell selection for a mobile device in a wireless communication system. The method includes receiving access barring information corresponding to a barred state of a first cell when the mobile device has a RRC connection with the first cell and performing an RRC connection re-establishment procedure according to the access barring information.

The present invention further discloses a mobile device of a wireless communication system for handling cell selection or reselection. The mobile device includes a computer readable recording medium, and a processor. The computer readable recording medium is used for storing program code corresponding to a process. The processor is coupled to the computer readable recording medium, and used for processing the program code to execute the process. The process includes receiving access barring information corresponding to a barred state of a first cell when the mobile device has a RRC connection with the first cell and performing an RRC connection re-establishment procedure according to the access barring information.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
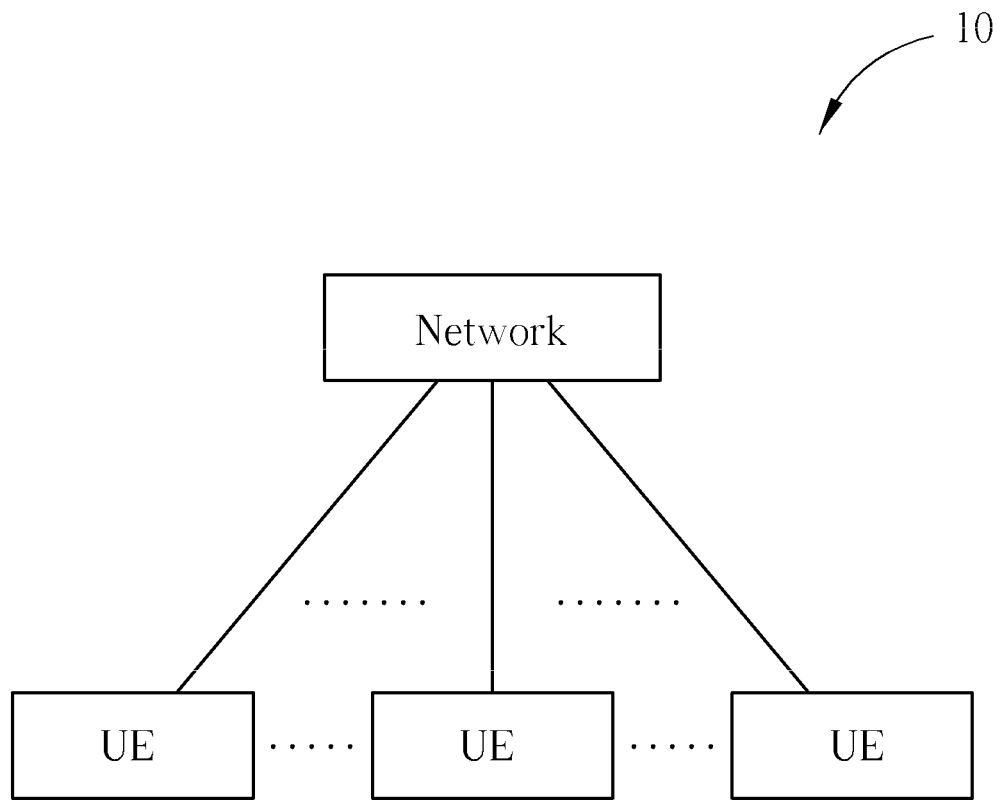
FIG. 1 is a schematic diagram of a wireless communication system according to an embodiment of the present invention.

Please refer to FIG. 1, which is a schematic diagram of a wireless communication system 10 according to an embodiment of the present invention. The wireless communication system 10, such as an LTE (long-term evolution) system or other mobile communication systems, is briefly composed of a network and a plurality of user equipments (UEs). In FIG. 1, the network and the UEs are simply utilized for illustrating the structure of the wireless communication system 10. Practically, the network comprising a plurality of base stations, such as an E-UTRAN (evolved-UTAN) comprising a plurality of evolved Node-Bs (eNBs) in the LTE system. The UEs can be devices such as mobile phones, computer systems, etc. Besides, the network and the UE can be seen as a transmitter or receiver according to transmission direction, e.g., for uplink, the UE is the transmitter and the network is the receiver, and for downlink, the network is the transmitter and the UE is the receiver.

Figure 2:
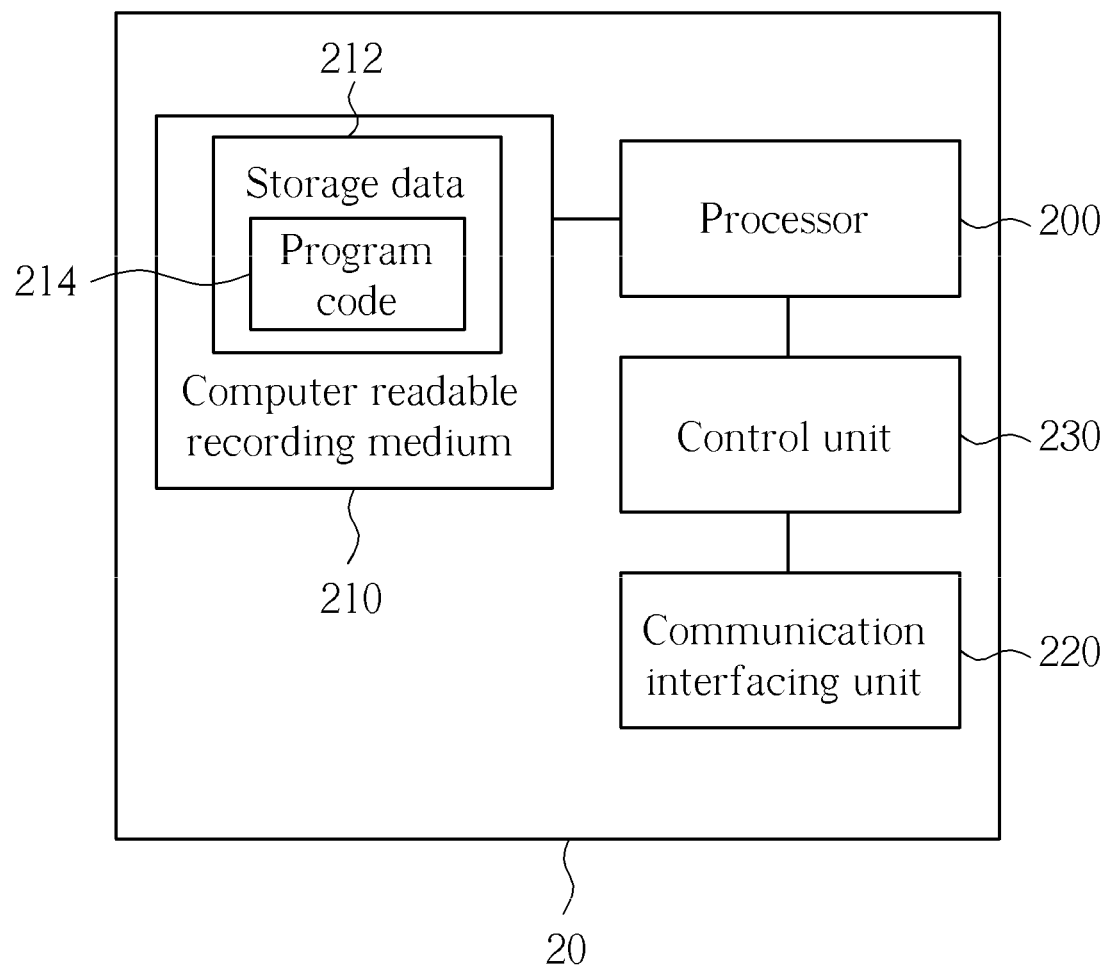
FIG. 2 is a schematic diagram of a mobile device according to embodiments of the present invention.

Please refer to FIG. 2, which is a schematic diagram of a mobile device 20 according to embodiments of the present invention. The mobile device 20 can be the UE shown in FIG. 1 and includes a processor 200, a computer readable recording medium 210, a communication interfacing unit 220 and a control unit 230. The computer readable recording medium 210 may be any data storage device that stores storage data 212, including program code 214, thereafter read and processed by the processor 200. Examples of the computer readable recording medium 210 include a subscriber identity module (SIM), read-only memory (ROM), random-access memory (RAM), CD-ROMs, magnetic tapes, hard disks, optical data storage devices, and carrier waves (such as data transmission through the Internet). The control unit 230 controls the communication interfacing unit 220 and related operations and states of the mobile device 20 according to processing results of the processor 200. The communication interfacing unit 220 is preferably a radio transceiver for wirelessly communicating with the network.

Figure 3:
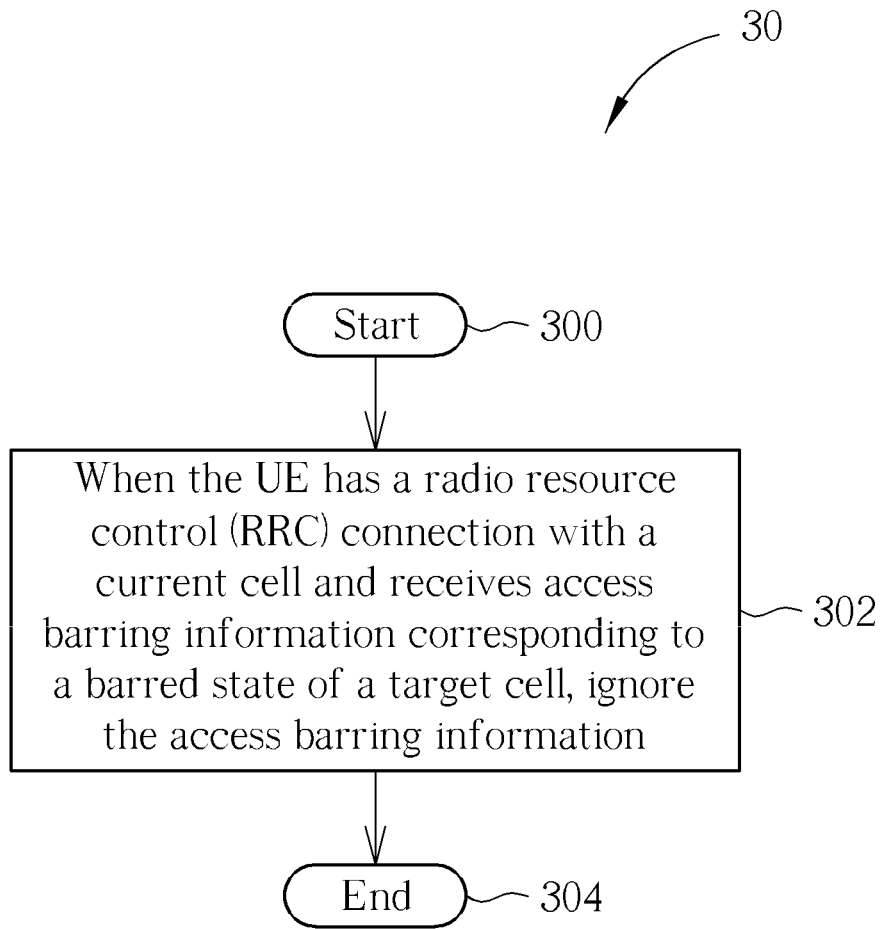
FIG. 3 is a flowchart of a process according to an embodiment of the present invention.

Please refer to FIG. 3, which is a flowchart of a process 30 according to an embodiment of the present invention. The process 30 is utilized for handling cell selection for a UE in the wireless communication system to avoid procedure failure, so as to prevent failure of a network resource management plan. The process 30 can be compiled into the program code 214 and includes the following steps:

Step 300: Start.

Step 302: When the UE has a radio resource control (RRC) connection with a current cell and receives access barring information corresponding to a barred state of a target cell, ignore the access barring information.

Step 304: End.

According to the process 30, the embodiment of the present invention ignores the access barring information received from the target cell when the UE has the RRC connection with the current cell. Please note that the UE having the RRC connection be in the RRC connected mode in the LTE system but is not limited to be only. For example, the UE also can be a UE in CELL_DCH/CELL_FACH state in UMTS system.

Preferably, the access barring information is included in a broadcast message of the target cell and includes cell status and the reservation information. The broadcast message can be a system information block type 1. Moreover, the cell status is indicated by a cellBarred information element (IE) and the reservation information is indicated by a cellReservedForOperatoruse IE and a cellReservationExtension IE.

The reception of the broadcast message can be trigged by a handover procedure, an RRC connection re-establishment procedure or a system information change procedure. According to the embodiment of the present invention, the UE ignores the access barring information to avoid handover procedure failure or RRC re-establishment procedure failure.

Besides, other steps can also be included in the process 30, and are not limited herein. For example, the embodiment of the present invention continuously receives system information of the target cell on a broadcast channel in the cell and moves the UE out of the target cell when the UE finds that the system information is changed compared with the previously-received system information. Preferably, the system information is changed by itself or by a system information change procedure, i.e. the UE receives a paging message with system information change indicator.

Take an example here based on the concept of the process 30. Under consideration of resource management, an E-UTRAN attempts to allocate a cell to the UEs in the RRC_Connected mode in other cells and thereby sets a cell to the barred status to avoid the UEs in the RRC_Idle mode to camp on. The E-UTRAN indicates the UEs in the RRC_Connected mode to move to the cell via handover procedures. When the UEs in the RRC_Connected mode reads SystemInformationBlockType1 including the cell status and reservation information of the cell, the UEs ignores the cell status and reservation information. In this situation, the UE does not consider that the cell is barred, and thereby continues the handover procedure. As a result, handover failure due to the barred state is avoided, and the resource management for the cell is performed as the E-UTRAN attempt.

In the abovementioned example, the UE in the RRC_Connected mode can continuously receive the system information of the cell with the barred status. When the E-UTRAN attempts to move all of the UE in the RRC_Connected mod out of the cell, the E-UTRAN can change the system information directly or by a system information change procedure.

Figure 4:
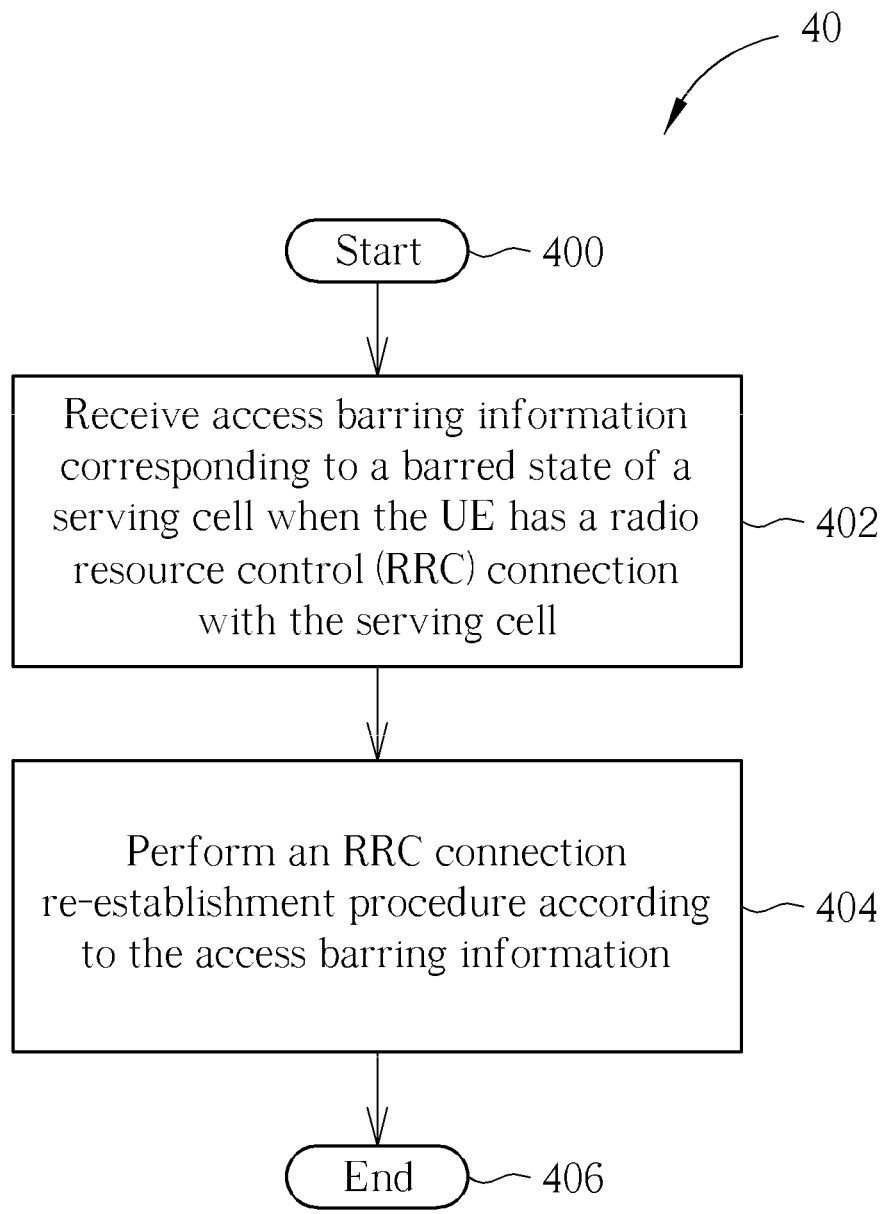
FIG. 4 is a flowchart of a process according to another embodiment of the present invention.

Please refer to FIG. 4, which is a flowchart of a process 40 according to another embodiment of the present invention. The process 40 is utilized for handling cell selection for the UE in the wireless communication system to avoid a break of data transmission. The process 40 can be compiled into the program code 214 and includes the following steps:

Step 400: Start.

Step 402: Receive access barring information corresponding to a barred state of a serving cell when the UE has an RRC connection with the serving cell.

Step 404: Perform an RRC connection re-establishment procedure according to the access barring information.

Step 406: End.

According to the process 40, the UE having the RRC connection with the serving cell performs the RRC connection re-establishment procedure according to the access barring information, corresponding to the barred state, received from the serving cell. Preferably, the UE performs the RRC connection re-establishment procedure when determining that the serving cell is in the barred state according to the access barring information. The UE selects another cell to send an RRC connection re-establishment request message for the RRC connection re-establishment. The selected cell is, preferably, not barred. Therefore, the embodiment of the present invention prevents the UE having the RRC connection from continuing data transmission/reception with the serving cell after the serving cell set to the barred state has stopped all data transmission. The UE avoids extra power consumption caused by one way data transmission and also can avoid a connection break (avoid entering a RRC_IDLE state) by performing the RRC connection re-establishment procedure.

Please note that the UE having the RRC connection can be a UE in the RRC connected mode in the LTE system but is not limited to be only. For example, the UE also can be in CELL_DCH/CELL_FACH state in UMTS system.

Preferably, the access barring information is included in a broadcast message of the serving cell and includes the cell status and the reservation information. The broadcast message can be a system information block type 1. The reception of the broadcast message is trigged by a handover procedure, an RRC connection re-establishment procedure or a system information change procedure. Moreover, the cell status is indicated by a cellBarred information element (IE) and the reservation information is indicated by a cellReservedForOperatoruse IE and a cellReservationExtension IE.

Take an example here based on the concept of the process 40. When an E-UTRAN changes a serving cell status from "not barred" to "barred" for operation and maintenance purposes, the serving cell stops any data transmission with UEs. The UEs in the RRC_Idle mode in the serving cell select other cells to camp on. The UEs in the RRC_Connected mode receive a broadcast message from the serving cell and reads cell status and reservation information included in the broadcast message. Based on the cell status and the reservation information, the UE determines that the serving cell is barred and thereby selects another cell to perform an RRC connection re-establishment procedure. Consequently, the UE resumes data transmission via the selected cell when the RRC connection is re-established. Thus, the RRC connection break resulting re-initiation of data transmission is avoided.

To sum up, the first embodiment of the present invention ignores the cell status and reservation information when the UE having the RRC connection receives the broadcast message comprising the cell status and the reservation information. Therefore, the first embodiment of the present invention can solve the procedure problems, such as handover or RRC re-establishment failure, caused by the UE moving to the cell with the barred status. In addiction, the second embodiment of the present invention performs the RRC connection re-establishment procedure according to the cell status and the reservation information and selects another cell for RRC connection re-establishment when the UE has RRC connection with the cell and determines the cell is barred. Consequently, the RRC connection avoids being dropped. The data transmission suspension and extra power consumption can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling cell selection for a mobile device in a wireless communication system, the method comprising:
when the mobile device has a radio resource control (RRC) connection with a first cell, and the mobile device receives access barring information corresponding to a barred state of a second cell when the mobile device is in a RRC connected mode with the first cell ignoring the access barring information by the mobile device in the RRC connected mode, wherein the access barring information is included in a broadcast message of the second cell, and the broadcast message is a system information block type 1 comprising cell status and reservation information.

2. The method of claim 1, wherein the reception of the broadcast message is trigged by a handover procedure, an RRC connection re-establishment procedure or a system information change procedure.

3. The method of claim 1, wherein the access barring information comprises the cell status and the reservation information.

4. The method of claim 3, wherein the cell status is indicated by a cellBarred information element (IE) and the reservation information is indicated by a cellReservedForOperatoruse IE and a cellReservationExtension IE.

5. The method of claim 1 further comprising:
continuously receiving system information of the second cell on a broadcast channel; and moving out of the second cell when the mobile device finds that the system information is changed.

6. The method of claim 1, wherein the second cell and the first cell are the same cell.

7. A mobile device of a wireless communication system for handling cell selection or reselection, the mobile device comprising:
- a non-transitory computer readable recording medium for storing program code corresponding to a process; and
- a processor coupled to the non-transitory computer readable recording medium, for processing the program code to execute the process;
- wherein the process comprises:
  - when the mobile device has a radio resource control (RRC) connection with a first cell, and the mobile device receives access barring information corresponding to a barred state of a second cell when the mobile device is in a RRC connected mode with the first cell, ignoring the access barring information by the mobile device in the RRC connected mode, wherein the access barring information is included in a broadcast message of the second cell, and the broadcast message is a system information block type 1 comprising cell status and reservation information.

8. The mobile device of claim 7, wherein the reception of the broadcast message is trigged by a handover procedure, an RRC connection re-establishment procedure or a system information change procedure.

9. The mobile device of claim 7, wherein the access barring information comprises the cell status and the reservation information.

10. The mobile device of claim 9, wherein the cell status is indicated by a cellBarred information element (IE) and the reservation information is indicated by a cellReservedForOperatoruse IE and a cellReservationExtension IE.

11. The mobile device of claim 7, wherein the process further comprises:
- continuously receiving system information of the second cell on broadcast channel; and
- moving out of the second cell with barred status when the UE finds the system information is changed.

12. The mobile device of claim 7, wherein the second cell and the first cell are the same cell.

* * * * *